United States Patent [19]

Band et al.

[11] Patent Number: 4,552,859

[45] Date of Patent: Nov. 12, 1985

[54] OLEFIN POLYMERIZATION CATALYST AND PROCESS

[75] Inventors: Elliot I. Band, Dobbs Ferry; Michael J. Breen, Campbell Hall, both of N.Y.

[73] Assignee: Stauffer Chemical Company, Westport, Conn.

[21] Appl. No.: 637,949

[22] Filed: Aug. 6, 1984

[51] Int. Cl.$^4$ ............................................. C08F 4/64
[52] U.S. Cl. .................................... 502/127; 502/105; 502/125; 502/126; 526/125; 526/128; 526/142
[58] Field of Search .............. 502/105, 125, 126, 127, 502/134

[56] References Cited

U.S. PATENT DOCUMENTS

| | | | |
|---|---|---|---|
| 3,135,809 | 6/1964 | Bosmajian | 502/103 X |
| 4,404,344 | 9/1983 | Sinn et al. | 502/117 X |
| 4,450,242 | 5/1984 | Mink | 502/125 X |
| 4,461,846 | 7/1984 | Harris et al. | 502/105 |

*Primary Examiner*—Patrick P. Garvin
*Attorney, Agent, or Firm*—Vivienne T. White

[57] ABSTRACT

Isotactic index improvement is achieved for $C_3$ and higher alpha olefins in systems containing a catalyst component comprising titanium supported on a magnesium halide support. The titanium component is formed by copulverizing the magnesium halide with one or more electron donors followed by treatment with liquid titanium halide. The improvement is achieved by using a dialkylaluminoxane component with the trialkylaluminum co-catalyst normally used. In slurry polymerizations, the isotactic index of the polymer has been improved.

11 Claims, No Drawings

OLEFIN POLYMERIZATION CATALYST AND PROCESS

The present invention relates to a catalyst for the polymerization of alpha olefins, such as propylene.

It is known to polymerize alpha olefins, such as propylene, using a catalyst component comprising titanium on a magnesium halide support, the component being obtained by copulverizing magnesium halide with at least one electron donor to form a copulverized product followed by reacting the copulverized product with a liquid titanium compound containing halogen. Such a component is then used in the polymerization reaction with a trialkylaluminum co-catalyst, e.g., triethylaluminum. An example of such a procedure is shown in U.S. Pat. No. 4,450,242.

Copending U.S. application Ser. No. 535,969, filed Sept. 26, 1983 discloses polymerization of a catalyst comprised of a titanium component in combination with a trialkylaluminum compound and a dialkyl aluminum monohalide component.

SUMMARY OF THE INVENTION

The present invention relates to a novel catalyst combination which comprises a trialkylaluminum/dialkylaluminoxane combination which unexpectedly gives increased isotactic index to the resulting polypropylene produced using it.

DETAILED DESCRIPTION OF THE PRESENT INVENTION

The catalyst of the present invention comprises: (a) a magnesium chloride-supported titanium-containing component; and (b) an organoaluminum cocatalyst combination, preferably with an electron donor.

Component (a) in the catalyst is a magnesium chloride-containing material which is formed by copulverizing magnesium chloride with one or more electron donors (Lewis bases) to form a copulverized product which is then contacted with a liquid titanium compound containing halogen. The types of electron donor materials which can be used are organic compounds containing O, N, S, or P moieties which share electrons. Some representative donor materials which can be used include phenol compounds, aliphatic and aromatic ethers, aliphatic and aromatic carboxylic esters, alcohols, aldehydes, ketones, aliphatic and aromatic carboxylic acids, lactones, polysiloxanes and carboxylic acyl halides. Representative donor materials suitable for activating the magnesium chloride support material are known in the art. Preferably, the donors used include phenol compounds, polysiloxanes and esters of a carboxylic acid (e.g., ethyl benzoate) as described in U.S. Pat. No. 4,450,242 above. The copulverization step can include $TiCl_4$ (e.g., as a complex with one or more of the donors). The amount of donor material used can range from about 0.05 to 3 times the weight of the magnesium chloride.

After the copulverized magnesium chloride/donor material has been formed by suitable grinding for a suitable length of time (e.g., 0.5 hr. to about 30 days), the product is treated with a liquid titanium halide, such as $TiCl_4$. The liquid titanium compound containing halogen is contacted with the activated magnesium halide at elevated temperature, (e.g., 60° C. to about 120° C.). The amount of titanium halide used can be varied quite widely, e.g., about 0.5 to 500 times the weight of the solid being treated.

The component (b) used in the present invention is a mixture of trialkylaluminum and a dialkylaluminoxane co-catalyst combination preferably with a suitable electron donor for the mixture (e.g., an ester of carboxylic acid).

The trialkylaluminum material has been conventionally used alone with the type of magnesium chloride component described before and includes such compounds as triethylaluminum, tri-n-butylaluminum, triisobutyl aluminum, and trihexylaluminum. The molar amount used preferably ranges from about 200:1 to about 10:1 based on the titanium content of component (a). The molar ratio of donor to component (a) can range from about 1:15 to about 100:1.

A novel addition to component (b), in accordance with the present invention, is a dialkylaluminoxane such as diethylaluminoxane. The total aluminum can be in a molar ratio of from about 10:1 to about 600:1 based on the moles of Ti in component (a). The molar ratio of trialkylaluminum to the dialkylaluminoxane component can range from about 10:1 to about 1:3, preferably from about 3:1 to about 1:1.

The types of donors useful with component (b) can be the conventional donors used with organoaluminum (e.g., the alkyl esters of aromatic carboxylic acids, which are preferred). Representative donors include methyl toluate, ethyl anisate and ethyl benzoate. The molar ratio of donor to the organoaluminum portion of component (b) used can range from about 1:20 to about 1:2.

The catalyst of the present invention (Ti containing component plus trialkylaluminum/dialkylaluminoxane) has been found to increase the isotactic index of polypropylene when utilized in slurry polymerization.

The following Examples are intended to further describe the present invention for purposes of further illustration.

EXAMPLE 1

This Example illustrates preparation of the titanium tetrachloride.ethyl benzoate complex used in the preparation of a particularly preferred catalyst in accordance with the present invention. The use of this complex is preferred but not required.

A 3-liter (L) three-necked flask was equipped with a gas inlet valve, a mechanical stirrer bearing driving a paddle made of TEFLON fluorocarbon polymer, and a 250-ml pressure equalizing dropping funnel. To this flask was added 1.5 L heptane (Phillips 99.9%) and 190 ml (1.73 mol) distilled $TiCl_4$ under rapid stirring followed by the slow addition of 245 ml (1.72 mol) ethyl benzoate (Aldrich 99+%) during a one-hour period. A yellow precipitate of the complex formed immediately. The mixture was stirred for two hours at ambient conditions. After transfer of the flask to a Vacuum Atmospheres Co. glove box under nitrogen, the mixture was filtered, washed with two liters heptane, and vacuum dried for about 17 hours. The yield approached theoretical.

EXAMPLE 2

This Example illustrates preparation of the copulverized, supported component containing titanium of the present invention.

Into a 6.2 L (Paul Abbe) jar mill was placed 500 g $MgCl_2$ vaccum-dried under heat containing about 1 percent water and 8.0 kg of 1.6-cm diameter (⅝ inch) stainless steel balls. This charge was milled for five days at about 50 rpm. The activated powder was separated from the milling balls by means of a No. 30 sieve.

The 8.0 kg of stainless steel balls, 1.6 cm. diameter and 250 g (2.62 mol) of activated $MgCl_2$ were recharged into the same mill along with 255 g of phenol (2.71 mol) and 37.5 ml 96-100 millipoise silicone oil (General Electric Co. SF 96-100). Milling at about 50 rpm was carried out for another five days. Then 132 g of the $TiCl_4$ ethyl benzoate complex of Example 1 was added to the charge and the new mixture milled for yet another five days (total 15 days). The orange-red product was then sieved thru a No. 30 screen to separate the product from the milling balls. The yield was 540 g.

Inside a glove box under nitrogen, 212 gm. of the milled product was charged into a 2 L, three-necked flask equipped with a 250-ml pressure equalizing dropping funnel, gas-inlet valve, and mechanical stirrer shaft. With stirring, under nitrogen, 625 ml. toluene was transferred into the reaction flask by cannula followed by the addition of 375 ml (3.41 mol) $TiCl_4$ also by cannula. The reaction mixture was stirred at about 100 rpm as the flask was slowly heated to 90° C. by an oil bath. After temperature equilibration for about one hour, the reaction was continued at about 90° C. for an additional three hours. The reaction flask was then cooled to ambient conditions over 45 minutes during which the solid phase settled, whereupon the supernatant liquid was removed by cannula. Then 1 L toluene was added with mild stirring, about 40 rpm, to wash the solid for ten minutes. After a settling time of a half-hour, the supernatant liquid was again removed by cannula. The washing was repeated once more with toluene and five times more with heptane (all washes 1 L). The washings were followed by transfer of the orange slurry to a 1 L, three-neck flask with additional heptane. The supernatant was removed by cannula; remaining heptane evaporated under vacuum. After sieving through a No. 140 screen, the yield from this $TiCl_4$ extraction process was 92 g of orange/brown powder (catalyst component (a)).

EXAMPLES 3-6

This Example illustrates the slurry polymerization of propylene in a solvent (heptane) employing the catalyst component of Example 2.

A 4.5 L reactor containing 2 L heptane stirred at 600 rpm was used to carry out a polymerization for 1.5 hours at 65° C. with the reactants added in the following order: TEAL, diethylaluminoxane, MPT donor, 50 mg catalyst component of Example 2, 3.2 psi (about 1/5 atmosphere) hydrogen moderator, and propylene maintained at 9 atm pressure.

After 1.5 hr. the reactor was vented, the product was filtered, washed, and air-dried. The Table sets forth the results that were obtained with the amount of TEAL,-diethylaluminoxane, and MPT being given in millimoles:

| EXAMPLE | TEAL | DIETHYL ALUMINOXANE | MPT | PRODUCTIVITY/II |
|---------|------|---------------------|-----|-----------------|
| 3*      | 12   | —                   | 3   | 9200/89.1       |
| 4*      | 6.9  |                     | 3.0 | 3200/94.0       |
| 5       | 6.9  | 5.1                 | 3.0 | 6500/92.6       |
| 6       | 6.9  | 5.1                 | 3.0 | 8300/91.8       |

*control

These data illustrate that the substitution of dialkylaluminoxane for some of the TEAL normally present as the co-catalyst results in an increase in isotactic index for the slurry polymerization of propylene.

What is claimed:

1. A catalyst for the polymerization of alpha olefins of the formula $CH_2=CHR$, where R is an alkyl radical of 1-6 carbon atoms and mixtures thereof with ethylene, comprising:
    (a) a component containing titanium on a magnesium halide support which is obtained by copulverizing magnesium halide with one or more electron donors to form a copulverized product followed by reacting the copulverized product with a liquid titanium compound containing halogen; and
    (b) an organoaluminum component comprising a trialkylaluminum compound in admixture with an effective amount of a dialkylaluminoxane component to give improved performance characteristics to the catalyst as compared to when the component consists of trialkylaluminum.
2. A catalyst as claimed in claim 1 wherein a phenol electron donor copulverized.
3. A catalyst as claimed in claim 1 wherein polysiloxane and phenol electron donors are copulverized.
4. A catalyst as claimed in claim 1 wherein a phenol electron donor, polysiloxane, titanium tetrahalide and a carboxylic ester electron donor are copulverized.
5. A catalyst as claimed in claim 1 wherein the liquid titanium compound containing halogen is $TiCl_4$.
6. A catalyst as claimed in claim 4 wherein the organoaluminum component comprises trialkylaluminum and a dialkylaluminoxane with a carboxylic ester donor.
7. A catalyst as claimed in claim 1 wherein the organoaluminum component contains triethylaluminum and diethylaluminoxane.
8. A catalyst as claimed in claim 5 wherein the organoaluminum component contains triethylaluminum and diethylaluminoxane.
9. A catalyst as claimed in claim 1 wherein a phenol electron donor, a polysiloxane electron donor, $TiCl_4$, and an ester of an aromatic carboxylic acid are copulverized with the magnesium chloride.
10. A catalyst as claimed in any of claims 1-8 and 9 where the total amount of aluminum in component (b) ranges from about 10:1 to about 600:1 as a molar ratio, based on the moles of titanium in component (a) and the mole ratio of trialkylaluminum to dialkylaluminoxane ranges from about 10:1 to about 1:3.
11. A catalyst as claimed in any of claim 1-8 and 9 wherein the mole ratio of trialkylaluminum to dialkylaluminoxane ranges from about 10:1 to about 1:3.

* * * * *